(No Model.) 5 Sheets—Sheet 1.
J. TAYLOR.
APPARATUS FOR TAKING IN, STOPPING, AND STOWING WIRE AND OTHER ROPE CABLES.
No. 251,744. Patented Jan. 3, 1882.
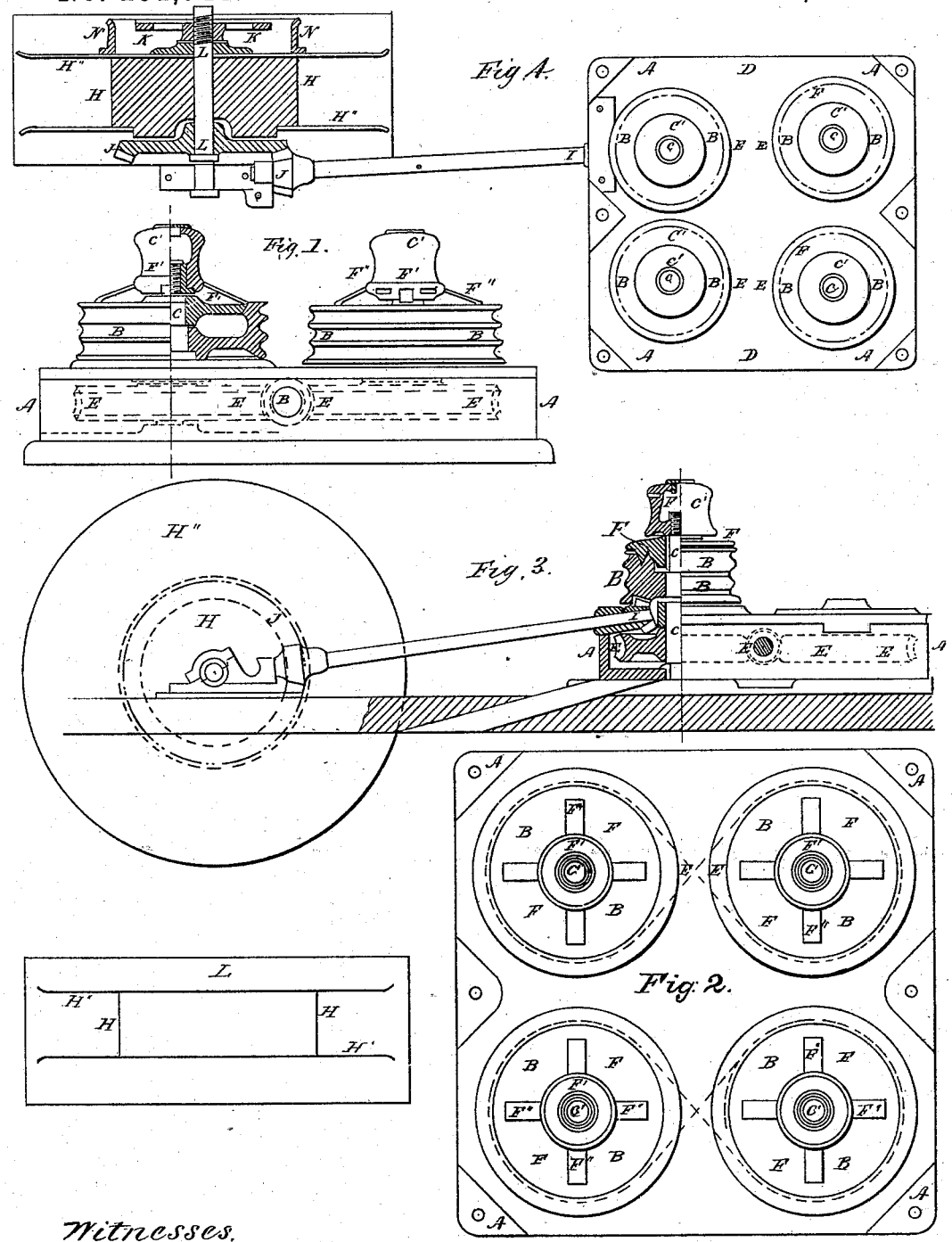
Witnesses.
Inventor.
James Taylor (No Model.) 5 Sheets—Sheet 2.
J. TAYLOR.
APPARATUS FOR TAKING IN, STOPPING, AND STOWING WIRE AND OTHER ROPE CABLES.
No. 251,744. Patented Jan. 3, 1882.
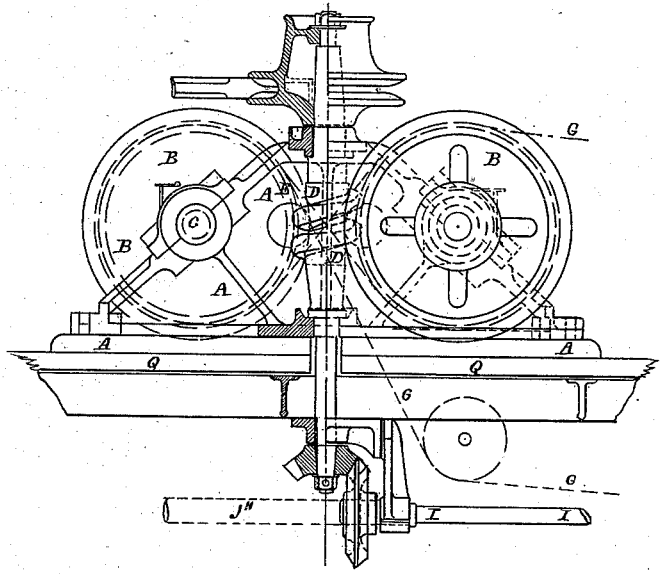
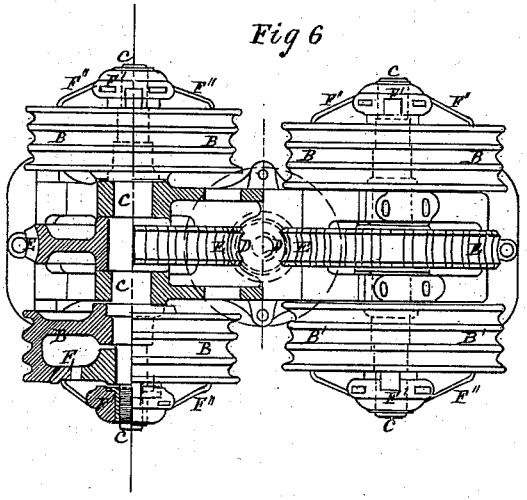
WITNESSES.
INVENTOR.

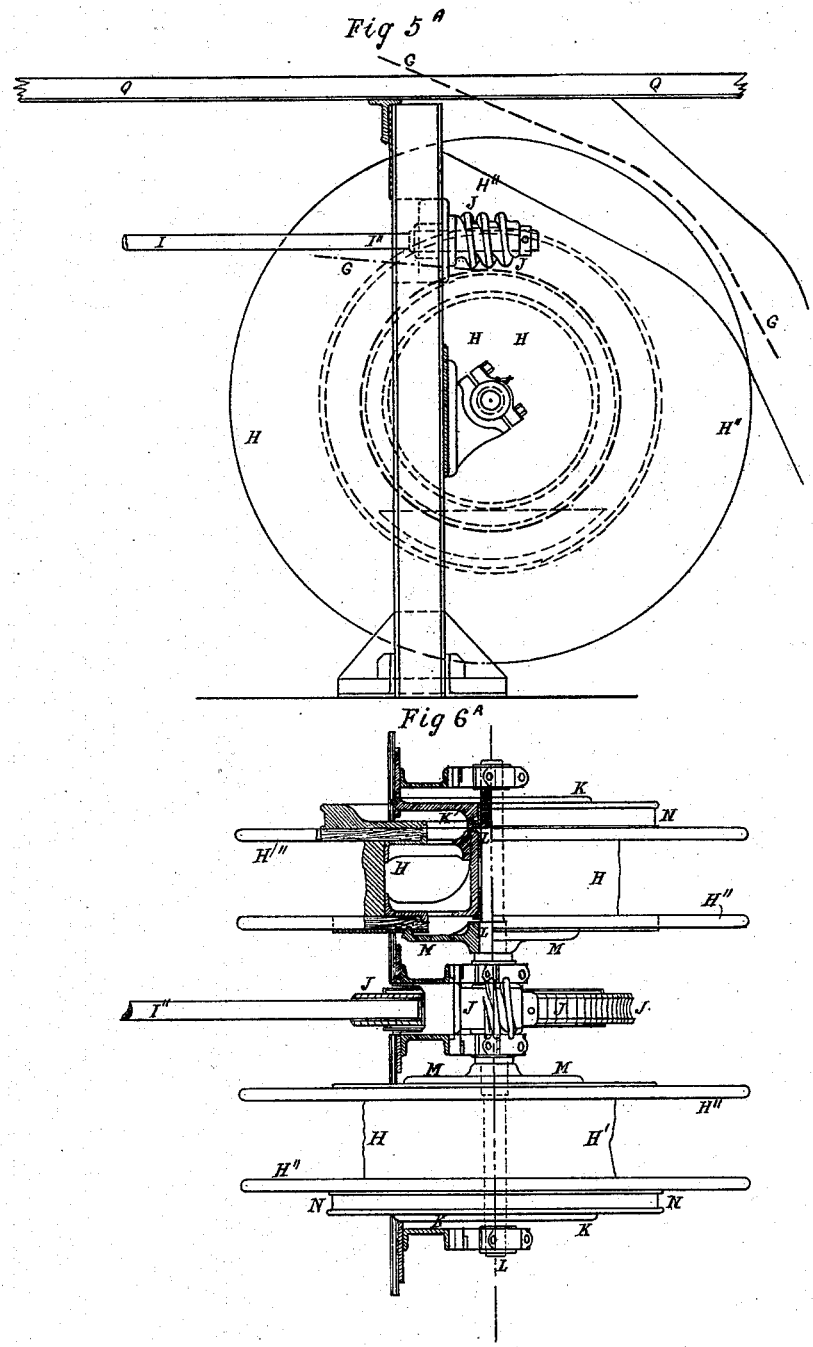

(No Model.) 5 Sheets—Sheet 4.
J. TAYLOR.
APPARATUS FOR TAKING IN, STOPPING, AND STOWING WIRE AND OTHER ROPE CABLES.
No. 251,744. Patented Jan. 3, 1882.
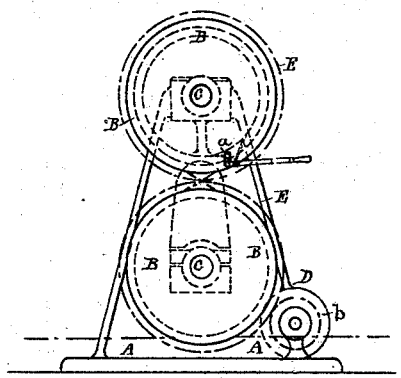
Fig 7
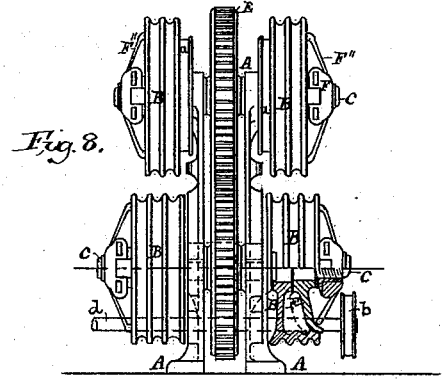
Fig. 8.
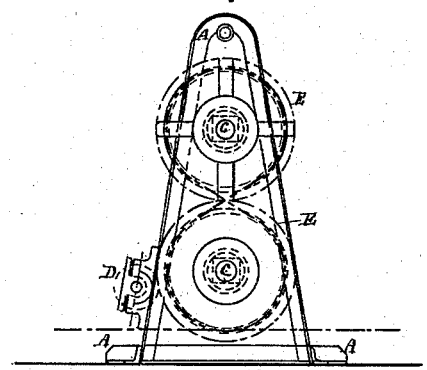
Fig 9
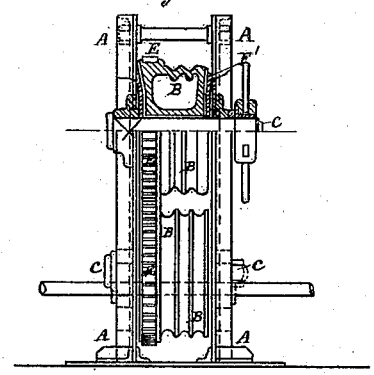
Fig 10
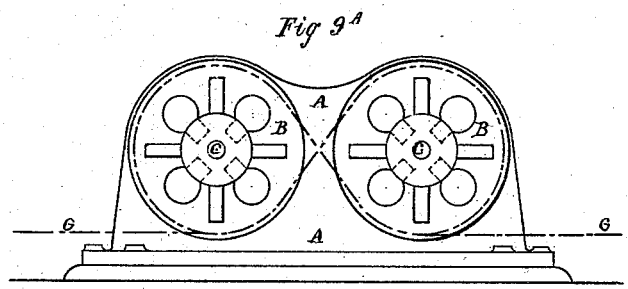
Fig 9ᴬ
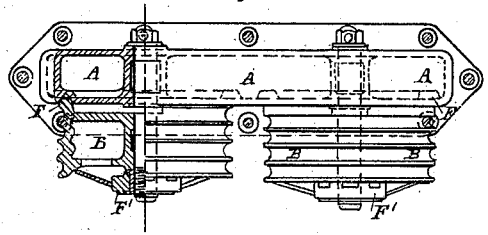
Fig 10ᴬ
WITNESSES.
Frederick John Cheshayth
John Harrington Redmond
INVENTOR.
James Taylor (No Model.) 5 Sheets—Sheet 5.
J. TAYLOR.
APPARATUS FOR TAKING IN, STOPPING, AND STOWING WIRE AND OTHER ROPE CABLES.
No. 251,744. Patented Jan. 3, 1882.
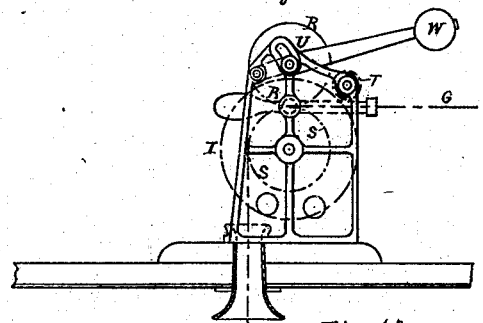
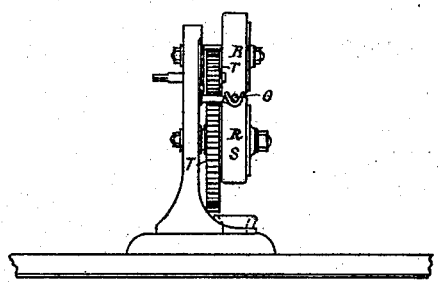
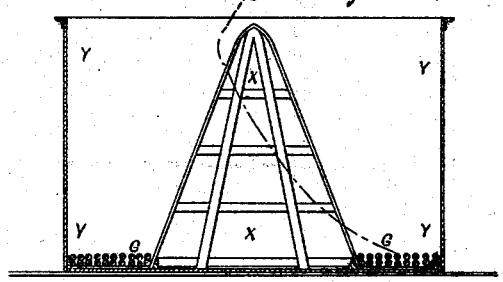
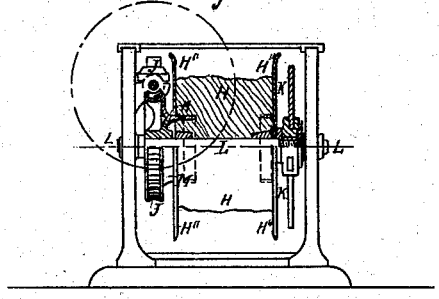
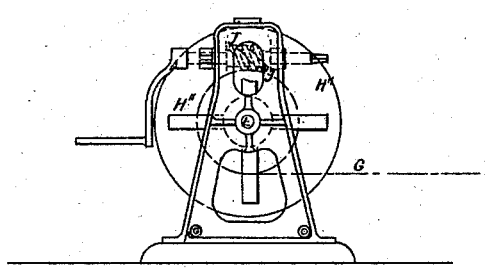
WITNESSES.
INVENTOR.

UNITED STATES PATENT OFFICE.

JAMES TAYLOR, OF BIRKENHEAD, COUNTY OF CHESTER, ENGLAND.

APPARATUS FOR TAKING IN, STOPPING, AND STOWING WIRE AND OTHER ROPE CABLES.

SPECIFICATION forming part of Letters Patent No. 251,744, dated January 3, 1882.

Application filed August 20, 1881. (No model.) Patented in England October 2, 1880.

*To all whom it may concern:*

Be it known that I, JAMES TAYLOR, a subject of the Queen of Great Britain, a resident of the town of Birkenhead, in the county of Chester, in that part of the United Kingdom of Great Britain and Ireland called England, have invented certain new and useful Improved Apparatus for Taking in, Stopping, and Stowing Wire and other Rope Cables, (for which I have obtained a patent in Great Britain, bearing date the 2d day of October, 1880, and numbered 3,999;) and I do hereby declare that the following is a full, clear, and exact description of the invention, sufficient to enable others skilled in the art to which it appertains to make and use the same, reference being had to the five sheets of drawings making a part of this specification.

My invention consists, essentially, of the novel combination of sheaves, friction-clutches, brakes, and winding-up drums illustrated at Figures 1, 2, 3, and 4 of the drawings; and Figs. 5, 5$^A$, 6, 6$^A$, 7, 8, 9, 10, 9$^A$, 10$^A$, 11, 12, 13, 14, and 15 show various examples of its application.

The object of my invention is the construction of reliable apparatus for taking in, stopping, and stowing wire and other rope cables, particularly steel-wire cables on board ship, in which case my invention is arranged to act as a cable stopper and as riding or mooring-bits. It is further applicable as deck-bits, windlasses, or capstans generally, for mooring, hauling, warping, and stowing purposes.

Referring to the drawings, Fig. 1 is a part sectional elevation of a horizontal example of my invention. Fig. 2 is a plan of Fig. 1. Fig. 3 is a part sectional elevation of another horizontal example of my invention. Fig. 4 is a plan of Fig. 3, partly in section. Figs. 5 5$^A$ show a part sectional elevation of a vertical example of my invention. Figs. 6 6$^A$ illustrate Figs. 5 5$^A$ in plan. Fig. 7 is a side elevation of another vertical example of my invention. Fig. 8 is an end view of Fig. 7. Fig. 9 is a side elevation of another vertical example of my invention. Fig. 10 is an end view of Fig. 9. Fig. 9$^A$ is a side elevation of another vertical example of my invention. Fig. 10$^A$ is a plan of Fig. 9$^A$, shown partly in section. Fig. 11 is a side elevation, partly in section, of an example of stowing-drum according to my invention. Fig. 12 is a side elevation of Fig. 11. Fig. 13 is a side elevation of taking-in drum according to my invention. Fig. 14 is an end view of Fig. 13. Fig. 15 is an example of stowing-drum in connection with Fig. 13.

It will be seen that I mount on a suitable base or casting, A, a duplex system of sheaves or pulleys, B B B B, carried by and running loose on suitable shafts or spindles, C C C C. The pulleys B are fixed, when in operation, to the spindles C by the friction or dead clutches F, which slide on a feather on the shafts or spindles C, and are brought into operation by the screw-nut F', the horns F'' of which bear on the friction-clutches F, as shown. In some cases the nut F' may be utilized as a mooring or fastening bit, as shown at Figs. 2 and 3. The spindles C have keyed onto them the worm-wheels E, which are driven by the worm D, which can be operated by hand, steam, or hydraulic power, and imparts motion to the pulleys B, when required. The rope taken in by the pulleys B is led to the stowing or taking-in drum H, which is operated from the pulleys B by the gear I J L. The drums H are loose on the shafts L, and are fixed thereto, when in operation, by the friction-clutches and gear K. Sufficient friction can be given to cause the drum to merely take in the required amount of the rope and adjust the tension of the rope between the drum H and the sheaves B.

In the example shown at Figs. 5 5$^A$ 6 6$^A$ there is represented a vertical arrangement of my invention, designed as a combined apparatus for taking in, stowing, and stopping wire rope or like cables, and paying out the same on board ship. The frame-work A, which carries the sheaves or pulleys B, is mounted on the deck Q Q, as shown at Fig. 5, and the stowing or taking-in drums are mounted and located below the deck Q Q, as shown at Fig. 5$^A$, which is a continuation of Fig. 5. The sheaves B B are driven by the vertical worm D and the worm-wheels E E. Over the worm D, and on the same shaft, is mounted a capstan, by which the apparatus may be operated by capstan-bars, or by a messenger-chain, as will be understood. If desired, the apparatus may be worked from a donkey-engine or the main engines through the bevel-gear I and the shaft J''. As previously described in reference to Fig. 1, the pulleys B are loose on their shafts C, and are brought into operation through the friction clutches or brakes F. In this example the pulleys B B and the drum H represent the gear for working the port cable and anchor; and the pulleys B' B' and the drum H' represent the gear for working the starboard cable and anchor. The drums H H' are loose on their shaft L, and are provided with friction-clutches M, which are operated by the hand-gear K, as shown.

N N are wooden disks attached to the drums H, and arranged for the application of strap friction-brakes. The drums H H' have centers covered with wood, on which the cable is wound, and corrugated metal sides or arms H''. The drums H H' are rotated by the worm and wheel gear J, as shown at Figs. 5A and 6A, which is worked by the gear I through the shaft I''. In this example, if desired, gipsy chain-wheels may be substituted for the port or starboard sheaves or pulleys B B or B' B'. By this arrangement a combined chain and rope apparatus is produced.

In operation the dotted lines G represent the wire-rope cable passing through the hawse-pipe in the bow of the ship at G', (see Fig. 5A,) and round the sheaves B B, as shown at Fig. 5. From the sheaves B B the rope cable passes under the deck Q and onto the drum H, as shown at Fig. 5A. For taking in the cable the friction-clutches F are tightened up so as to cause the sheaves B to rotate when the worm D is operated. The operation of the worm D through the gears I J imparts rotation to the drum H, the friction-gear K of which is likewise tightened. The drum H thus takes in the slack of the wire cable G as it is being wound in by the sheaves or pulleys B. When the motion of the apparatus is arrested the friction-gears of the sheaves or pulleys B and the friction-gears M N of the drum H cause the apparatus to serve as a cable-stopper or riding or mooring bits. To prevent sudden jerks on the cable paying out the cable by overcoming the friction when a steam-motor is used, I connect a portion of the cable G to a lever, which operates the valve of the engine sufficiently to cause the apparatus to take in or recover the portion paid out by the jerk.

The example shown in Figs. 7 and 8 illustrates a vertical arrangement of my invention, in which the sheaves or pulleys B are driven by a pinion and toothed wheels E E. As in previous examples, the sheaves or pulleys B B are loose on their shaft C, and are brought into gear through the friction-clutches F, and their motion can be controlled or arrested by strap friction-brakes on the disks $a$ $a$ on the pulleys B, or by the brakes $b$ on the driving-shaft $d$.

The example shown in Figs. 9 and 10 illustrates a vertical arrangement of my invention, showing a single arrangement of sheaves or pulleys B worked by a pinion, D, and toothed wheels E E. In this case the friction gear and clutch are shown applied to the upper sheave only. This arrangement is particularly applicable as a light windlass and cable-stopper, and can also be applied to tow-ropes. Figs. 9A and 10A show a modification of Figs. 9 and 10, the shafts C being fixed and the pulleys B loose thereon.

Fig. 11 illustrates a sectional elevation, and Fig. 12 an end view, of a taking-in drum suitable for use in connection with the examples illustrated at Figs. 7, 8, 9, 10, 9A, and 10A.

Figs. 13, 14, and 15 show a further example of an apparatus which may be used with my invention for taking in and stowing. It consists of a pair of rollers, R S, covered with india-rubber or other yielding substance. The rollers are worked by a hand-crank and toothed wheels T. The upper roller, R, is capable of being lifted away from the roller S by its bearing being in the quadrant U. The lever and weight W control the roller R. The cable G passes between the rollers R S, as shown, and automatically coils round the drum X, which is set in the guard Y.

My invention is applicable for many and various uses, such as windlasses for ships' cables, and for general use, for warping and hauling on board ship, especially salvage-ships, and for towing purposes. It is also applicable in coal-pits or mining-shafts, railway-yards, warehouses, tunneling purposes, cranes, shear-legs, derricks, and lifts of all kinds.

Having now described my invention and shown how the same may be put into practice, I claim—

1. The combination of mounting sheaves or pulleys B, friction-clutches F, and friction-gear K, coacting in relation to each other, substantially as described, for the purpose specified.

2. The arrangement of the pulleys B shown at Figs. 1 and 2 of the drawings hereto annexed.

3. The arrangement of the pulleys B, in combination with the friction stowing-drums H, as shown at Figs. 3 and 4 of the drawings hereto annexed.

4. The arrangement and combination of pulleys, friction-clutches, gearing, and frictional stowing-drums, as herein described, and shown at Figs. 5, 5A and 6, 6A of the drawings hereto annexed.

5. The arrangement of pulleys, friction-clutches, brakes and operating-gear herein described, and shown at Figs. 7 and 8 of the drawings hereto annexed.

6. The arrangement of pulleys, friction-clutches, and operating-gear herein described, and shown at Figs. 9, 10, 9A and 10A of the drawings hereto annexed.

7. The various arrangements of friction-drums for taking in and stowing wire-rope or other like cable, as herein described, and shown at Figs. 3, 4, 5A, 6A, 11, 12, 13, 14, and 15, of the drawings hereto annexed.

8. The combination of corrugated sides or plates H'' with the friction stowing-drum H, substantially as described, for the purpose specified.

JAMES TAYLOR.

Witnesses:
FREDERICK JOHN CHEESBROUGH,
JOHN HAMILTON REDMOND,
Both of 15 Water Street, Liverpool, England.